(12) United States Patent
Nagai et al.

(10) Patent No.: US 7,830,675 B2
(45) Date of Patent: Nov. 9, 2010

(54) SWITCHING POWER SUPPLY DEVICE AND METHOD OF STARTING THE SAME

(75) Inventors: Tamiji Nagai, Atsugi (JP); Toshio Nagai, legal representative, Tokyo (JP); Kazuo Yamazaki, Atsugi (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 325 days.

(21) Appl. No.: 12/095,471

(22) PCT Filed: Nov. 27, 2006

(86) PCT No.: PCT/JP2006/323537

§ 371 (c)(1),
(2), (4) Date: May 29, 2008

(87) PCT Pub. No.: WO2007/063788

PCT Pub. Date: Jun. 7, 2007

(65) Prior Publication Data

US 2010/0135048 A1      Jun. 3, 2010

(30) Foreign Application Priority Data

Dec. 1, 2005    (JP) .............................. 2005-347870

(51) Int. Cl.
*H02M 3/335*   (2006.01)

(52) U.S. Cl. ........................ 363/21.01; 363/18; 363/19; 363/20

(58) Field of Classification Search ................... 363/17, 363/18, 19, 20, 21.01, 21.04, 49, 56.09, 134
See application file for complete search history.

(56) References Cited

U.S. PATENT DOCUMENTS

| 5,852,550 | A  | * | 12/1998 | Majid et al. | 363/21.05 |
| 6,236,577 | B1 | * | 5/2001  | Bando | 363/19 |
| 6,449,177 | B1 | * | 9/2002  | Chen | 363/95 |
| 2004/0076022 | A1 | * | 4/2004 | Hong et al. | 363/21.01 |

FOREIGN PATENT DOCUMENTS

| JP | 57-151627   U | 9/1982 |
| JP | 4-69057     A | 3/1992 |
| JP | 8-171429    A | 7/1996 |
| JP | 3244424     A | 10/1997 |
| JP | 11-32478    A | 2/1999 |
| JP | 2001-103742 A | 4/2001 |
| JP | 2002-199723 A | 7/2002 |
| JP | 2003-223229 A | 8/2003 |
| JP | 2005-110346 A | 4/2005 |
| JP | 2005-295632 A | 10/2005 |

* cited by examiner

*Primary Examiner*—Bao Q Vu
*Assistant Examiner*—Nguyen Tran
(74) *Attorney, Agent, or Firm*—Holtz, Holtz, Goodman & Chick, PC

(57) ABSTRACT

To reduce power loss during standby.

In a switching power supply device using a first power supply circuit (11) having a small output and a second power supply circuit (12) having a large output, the first power supply circuit (11) is continuously kept in an operating state and the second power supply circuit (12) is started by using an electric power generated in the first power supply circuit (11).

9 Claims, 10 Drawing Sheets

SWITCHING POWER SUPPLY DEVICE AND METHOD OF STARTING THE SAME

This application is a U.S. National Phase Application under 35 USC 371 of International Application PCT/JP2006/323537 filed Nov. 27, 2006.

TECHNICAL FIELD

This invention relates to a switching power supply device and, in particular, to a method of starting the switching power supply device.

BACKGROUND ART

As is well known in the art, a switching power supply device means a power converter for converting a DC voltage (input voltage) having a particular voltage level into a DC voltage (output voltage) having another voltage level. The switching power supply device is also called a DC-DC converter or a switching regulator. In the switching power supply device, a transistor is used as a switch and is switched to convert the input voltage into an AC voltage. Then, the voltage is stepped up or stepped down by an inductance element, such as a transformer or an inductor, and thereafter rectified to be converted into the output voltage.

As a switching power supply device of the type, there is a device using a first power supply circuit having a small output and a second power supply circuit having a large output. The first power supply circuit is used to supply an electric power to a control circuit, as a load, which operates in response to a command signal as an electric wave (for example, an infrared ray) from a remote controller. The second power supply circuit is used to supply an electric power to a device body (set circuit) as a load. The conventional switching power supply device is continuously kept in an operating state once it is started. In other words, the first power supply circuit and the second power supply circuit are continuously kept in an operating state regardless of a state of the load.

Various prior art techniques related to the present invention are known. For example, Patent Document 1 discloses a switching power supply device in which an AC power supply input is supplied to a rectifier through a filtering inductance element and an output from the rectifier is subjected to switching control. In the switching power supply device, an additional winding is provided for the above-mentioned filtering inductance element and, by an output from the additional winding, a starting power is supplied to a circuit section for carrying out the switching control mentioned above.

Further, Patent Document 2 discloses an improved dual power supply circuit for generating two kinds of power supply voltages. The power supply circuit disclosed in Patent Document 2 is used in a device requiring two kinds of power supply voltages, i.e., a high-level power supply voltage and a low-level power supply voltage. The power supply circuit is used when such two kinds of power supply voltages are supplied by one power supply circuit. The power supply circuit comprises a first voltage generating section for generating a first output voltage (high-level power supply voltage) and a second voltage generating section for generating a second output voltage (low-level power supply voltage). The first voltage generating section is provided with a first control section, while the second voltage generating section is provided with a second control section. Between a power supply voltage input terminal of the second control section and a power supply voltage input terminal of the first control section, a switching circuit is provided which is turned on when a potential of the power supply voltage input terminal of the second control section is increased over a predetermined potential. This switching circuit supplies a power supply voltage to the first control section after the second control section is completely started. Therefore, the first voltage generating section is started only after the second voltage generating section is started.

Furthermore, Patent Document 3 discloses a switching power supply comprising a power supply for starting a PWM circuit and suppressing power consumption with a simple structure. This switching power supply disclosed in Patent Document 3 comprises a first converter, a second converter, and the PWM circuit. The PWM circuit starts, before starting the first converter, the second converter for supplying an electric power to the PWM circuit upon start-up of the switching power supply.

Furthermore, Patent Document 4 discloses a technique for supplying a storage power of a single-systematic battery to a circuit, such as a central processing unit of a computer, and to a start-up circuit, while suppressing an expansion of a scale of a power supply device. The power supply device disclosed in Patent Document 4 is a power supply device for use in a computer and comprises two transformers including a main transformer used in a feeding system for feeding an electric power to a circuit, such as a central processing unit, and a backup transformer used in a feeding system for feeding an electric power to the start-up circuit. A charged voltage of an input capacitor is charged into an output capacitor through the backup transformer. A charged voltage of this output capacitor is outputted to the start-up circuit. An electric power produced by the backup transformer is supplied to an output voltage control circuit. If a start-up switch is operated in the above-mentioned state, the start-up circuit produces a start-up signal. Responsive to the start-up signal, the output control circuit starts an operation. Consequently, the charged voltage of the input capacitor is supplied to the central processing unit through the main transformer.

Patent Document 1: Japanese Unexamined Utility Model Application Publication (JP-U) No. S57-151627
Patent Document 2: Japanese Patent Publication (JP-B) No. 3244424
Patent Document 3: Japanese Unexamined Patent Application Publication (J P-A) No. 2002-199723
Patent Document 4: Japanese Unexamined Patent Application Publication (JP-A) No. 2005-110346

DISCLOSURE OF THE INVENTION

Problem to be Solved by the Invention

Patent Document 1 only discloses that the starting power is supplied, by the output from the additional winding, to the circuit section for carrying out switching control and does not disclose that, in a switching power supply device using a first power supply circuit having a small output and a second power supply circuit having a large output, how to start the second power supply circuit. Further, the switching power supply device disclosed in Patent Document 1 is continuously kept in an operating state. Therefore, there is a problem that a large amount of electric power is continuously consumed even in a standby state.

Patent Document 2 only discloses a technical idea that, when the power supply circuit (switching power supply device) itself is started, the first voltage generating section is started after the second voltage generating section is started. Therefore, the power supply circuit (switching power supply device) disclosed in Patent Document 2 is continuously kept in an operating state once it is started. Thus, similarly to the switching power supply device disclosed in Patent Document 1, the power supply circuit (switching power supply device) disclosed in Patent Document 2 has a problem that a large amount of electric power is continuously consumed even in a standby state.

Similarly to Patent Document 2, Patent Document 3 only discloses a technical idea that the second converter is started before the first converter is started. Therefore, similarly to Patent Document 2, the switching power supply disclosed in Patent Document 3 is also continuously kept in an operating state once it is started. Thus, similarly to the switching power supply devices disclosed in Patent Document 1 and Patent Document 2, the switching power supply disclosed in Patent Document 3 has a problem that a large amount of electric power is continuously consumed even in a standby state.

In Patent Document 4, an electric power produced by the backup transformer is supplied to the output voltage control circuit. The start-up circuit outputs the start-up signal in response to the operation of the start-up switch. Responsive to the start-up signal, the output voltage control circuit starts an operation to supply the charged voltage of the input capacitor to the central processing unit through the main transformer.

In any event, the switching power supply devices disclosed in Patent Documents 1 through 3 have the problem that a large amount of electric power is consumed in a standby state. As mentioned above, it is assumed that the switching power supply device uses the first power supply circuit having a small output and the second power supply circuit having a large output. It is assumed that the first power supply circuit is used to supply an electric power to the control circuit, as a load, which operates in response to a command signal as an electric wave (for example, an infrared ray) from a remote controller, while the second power supply circuit is used to supply an electric power to a device body (set circuit) as a load. The conventional switching power supply devices are continuously kept in an operating state once they are started. In other words, the first power supply circuit and the second power supply circuit are continuously kept in an operating state. As well known, in the remote controller, a time period of the standby state is longer than a time period of actual operation. As described above, regardless of the long time period of the standby state, the second power supply circuit is kept in an operating state even in the standby state of the load (set circuit). This increases a power loss during standby.

It is therefore an object of the present invention to provide a switching power supply device which is capable of reducing a power loss during standby and a method of starting the same.

Other objects of the present invention will become apparent as the description proceeds.

Means to Solve the Problem

According to this invention, there is provided a method of starting a switching power supply device using a first power supply circuit having a small output and a second power supply circuit having a large output, the method including a step of starting, under a condition where the first power supply circuit is continuously kept in an operating state, the second power supply circuit by using an electric power generated in the first power supply circuit.

In the above-mentioned method of starting the switching power supply device, it is preferable that an output power ratio between the first power supply circuit and the second power supply circuit may be not less than 1:1000. The second power supply circuit may be operated in response to a start-up signal. In this event, a feedback signal of the first power supply circuit may be used as the start-up signal, the start-up signal may be generated by detecting a state of a load of the first power supply circuit, or a feedback signal of the second power supply circuit may be used as the start-up signal. In addition, the method may further include a step of stopping the second power supply circuit.

Effect of the Invention

In the present invention, the first power supply circuit is continuously kept in an operating state and the second power supply circuit is started by using an electric power generated in the first power supply circuit. Therefore, the present invention has an effect that a power loss during standby can be reduced.

BEST MODE FOR EMBODYING THE INVENTION

Figure 1:
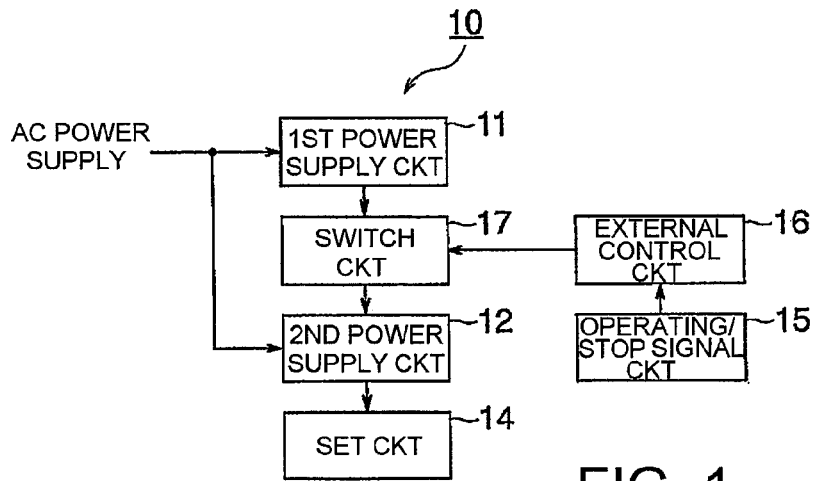
FIG. 1 A block diagram showing a schematic structure of a switching power supply device according to a first embodiment of the present invention.

Referring to FIG. 1, description will be made about a switching power supply device 10 according to a first embodiment of the present invention. The illustrated switching power supply device 10 comprises a first power supply circuit 11, a second power supply circuit 12, a set circuit 14, an operating/stop signal circuit 15, an external control circuit 16, and a switch circuit 17.

The first power supply circuit 11 is a power supply circuit having a small output, while the second power supply circuit 12 is a power supply circuit having a large output. In other words, a first output power produced by the first power supply circuit 11 is low, while a second output power produced by the second power supply circuit 12 is higher than the first output power. For example, a load supplied with the first output power produced by the first power supply circuit 11 is a control circuit (which will later be described) operating in response to a command signal as an electric wave (for example, an infrared ray) from a remote controller. On the other hand, a load supplied with the second output power produced by the second power supply circuit 12 is the set circuit 14, such as a device body. As will later be described, the first power supply circuit 11 includes a first control circuit, while the second power supply circuit 12 includes a second control circuit.

In the present embodiment, an output (electric power) ratio between the first power supply circuit 11 and the second power supply circuit 12 is not less than 1:1000.

An AC power supply is applied to the first power supply circuit 11 and the first power supply circuit 11 is continuously operated. An electric power for operating the second control circuit (which will later be described) of the second power supply circuit 12 is supplied from the first power supply circuit 11 through the switch circuit 17. Specifically, by turning on/off the switch circuit 17 by a control signal of the external control circuit 16, the electric power supplied from the first power supply circuit 11 to the second control circuit of the second power supply circuit 12 is controlled to thereby operate/stop the second power supply circuit 12. The external control circuit 16 is supplied with an operating signal or a stop signal from the operating/stop signal circuit 15.

Thus, by controlling an electric power supplied from the first power supply circuit 11, the second power supply circuit 12 is operated/stopped. In other words, the second power supply circuit 12 is started by using an electric power generated in the first power supply circuit 11.

With this structure, the second power supply circuit 11 can be stopped in operation when the set circuit 14 as a load is in a standby state. Only when the set circuit 14 is brought into an operating state, the second power supply circuit can be operated to supply an electric power to the set circuit 14. Therefore, power consumption in a standby state can drastically be reduced.

Generally, in a power supply circuit (in particular, a switching-type power supply circuit), in order to increase an output power, a start-up circuit also requires a greater electric power. Specifically, since the start-up circuit consumes an electric power even when the power supply circuit is in an off state, the power supply circuit having a large output power also has a large power consumption during standby. Reduction of the electric power in a standby state is enabled if a power supply circuit having a large output is started by an output of another power supply circuit having a smaller output. In this case, if a ratio of an output power of the large-output power supply circuit and an output power of the small-output power supply circuit is 1000:1 or more, it is possible to reduce an electric power during standby to $\frac{1}{1000}$ or less. Preferably, if the ratio is 10000:1 or more, it is possible to drastically reduce an electric power during standby to $\frac{1}{10000}$ or less. More preferably, if the ratio is 100000:1 or more, the electric power is drastically reduced to $\frac{1}{100000}$ or less. Thus, it is possible to achieve energy saving in an apparatus using this power supply device.

Figure 2:
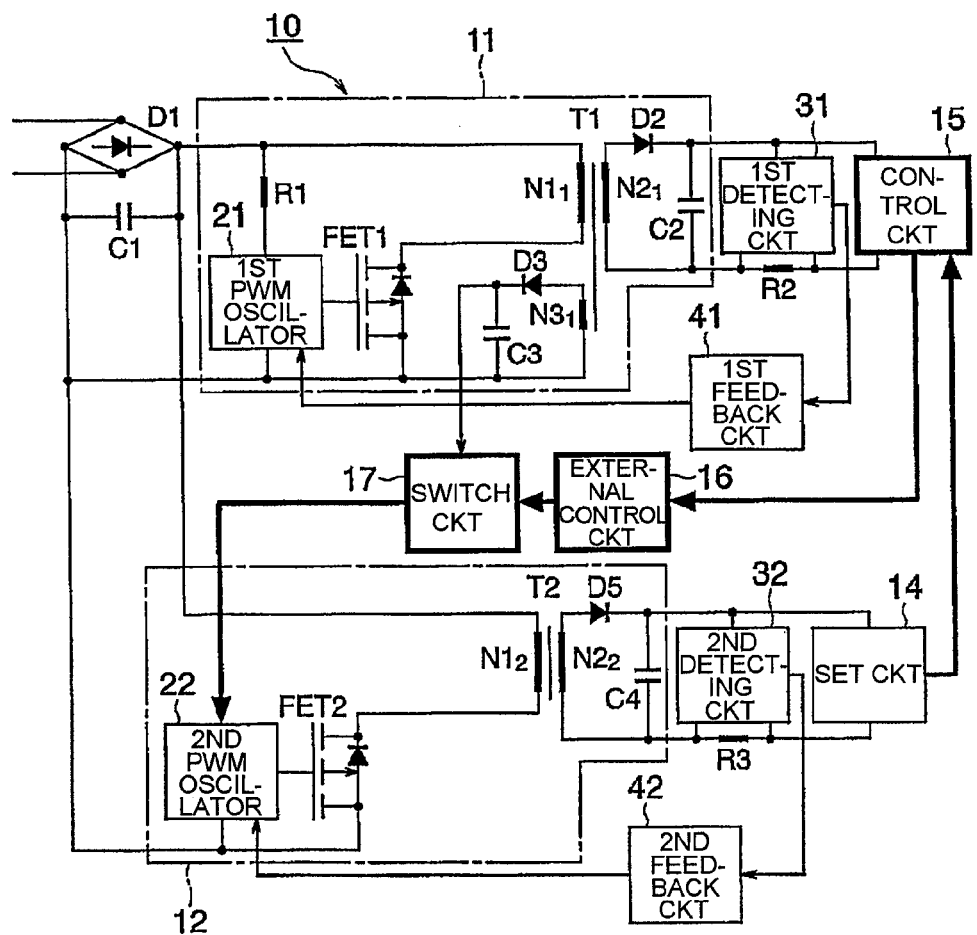
FIG. 2 A block diagram showing a specific example of the switching power supply device shown in FIG. 1.

Referring to FIG. 2, a specific example of the switching power supply device 10 illustrated in FIG. 1 will be described.

The switching power supply device 10 comprises a full-wave rectifier D1 for full-wave rectifying an AC input voltage supplied from the AC power supply to produce a full-wave rectified voltage, and an input capacitor C1 for smoothing this full-wave rectified voltage to produce a smoothed voltage. The smoothed voltage is supplied to the first power supply circuit 11 and to the second power supply circuit 12.

The illustrated first power supply circuit 11 has a resistor R1, a first insulating transformer T1 having a primary winding $N1_1$, a secondary winding $N2_1$, and a tertiary winding (auxiliary winding) $N3_1$, a first field-effect transistor FET1 as a first switching element connected to the primary winding $N1_1$ of the first insulating transformer T1, a diode D2 for rectifying an AC voltage induced in the secondary winding $N2_1$ of the first insulating transformer T1, and a first output capacitor C2 for smoothing the voltage rectified by the diode D2 to produce a first output voltage.

In the example being illustrated, the first output voltage is supplied to a control circuit serving as the operating/stop signal circuit 15. As mentioned above, the control circuit 15 is operated in response to the command signal as the electric wave (for example, an infrared ray) from the remote controller (not shown).

The first power supply circuit 11 further comprises a first PWM oscillator 21 for generating, in response to a first feedback signal which will later be described, a first pulse width modulation (PWM) signal for turning on/off the first field-effect transistor FET1. The first PWM oscillator 21 is operated as the above-mentioned first control circuit. An AC voltage induced in the auxiliary winding $N3_1$ of the first insulating transformer T1 is rectified by a diode D3, thereafter smoothed by a capacitor C3 and, as will later be described, supplied, as an auxiliary voltage, to the second power supply circuit through the switch circuit 17. Thus, the auxiliary voltage smoothed by the capacitor C3 is used as a voltage (electric power) necessary for operating the second control circuit (which will later be described) of the second power supply circuit 12.

The switching power supply device 10 comprises a first detecting circuit 31 for detecting the first output voltage and a first output current (first load current) flowing through a resistor R2 to produce a first output detected signal, and a first feedback circuit 41 for feeding back the first output detected signal as the above-mentioned first feedback signal to a primary side circuit of the first power supply circuit 11.

On the other hand, the illustrated second power supply circuit 12 comprises a second insulating transformer T2 having a primary winding $N1_2$ and a secondary winding $N2_2$, a second field-effect transistor FET2 as a second switching element connected to the primary winding N1₂ of the second insulating transformer T2, a diode D5 for rectifying an AC voltage induced in the secondary winding N2₂ of the second insulating transformer T2, and a second output capacitor C4 for smoothing the voltage rectified by the diode D5 to produce a second output voltage.

In the example being illustrated, this second output voltage is supplied to the set circuit 14 which is the device body.

The second power supply circuit 12 further comprises a second PWM oscillator 22 for generating, in response to a second feedback signal which will later be described, a second pulse width modulation (PWM) signal for turning on/off the second field-effect transistor FET2. The second PWM oscillator 22 is operated as the above-mentioned second control circuit.

The switching power supply device 10 comprises a second detecting circuit 32 for detecting the second output voltage and a second output current (second load current) flowing through a resistor R3 to produce a second output detected signal, and a second feedback circuit 42 for feeding back the second output detected signal as the above-mentioned second feedback signal to a primary side circuit of the second power supply circuit 12.

The control circuit 15 is supplied with a signal from the set circuit 14. The control circuit 15 is responsive to the signal from the set circuit 14 and a command signal from the remote controller and supplies an operating signal or a stop signal to the external control circuit 16. Responsive to the operating signal, the external control circuit 16 turns on the switch circuit 17 to supply the auxiliary voltage (electric power) stored in the capacitor C3 to the second PWM oscillator (second control circuit) 22 of the second power supply circuit 12. On the other hand, responsive to the stop signal, the external control circuit 16 turns off the switch circuit 17 to stop the supply of the auxiliary voltage (electric power) stored in the capacitor C3 to the second PWM oscillator (second control circuit) 22. In any case, the second PWM oscillator 22 serves as the second control circuit of the second power supply circuit 12.

Figure 3:
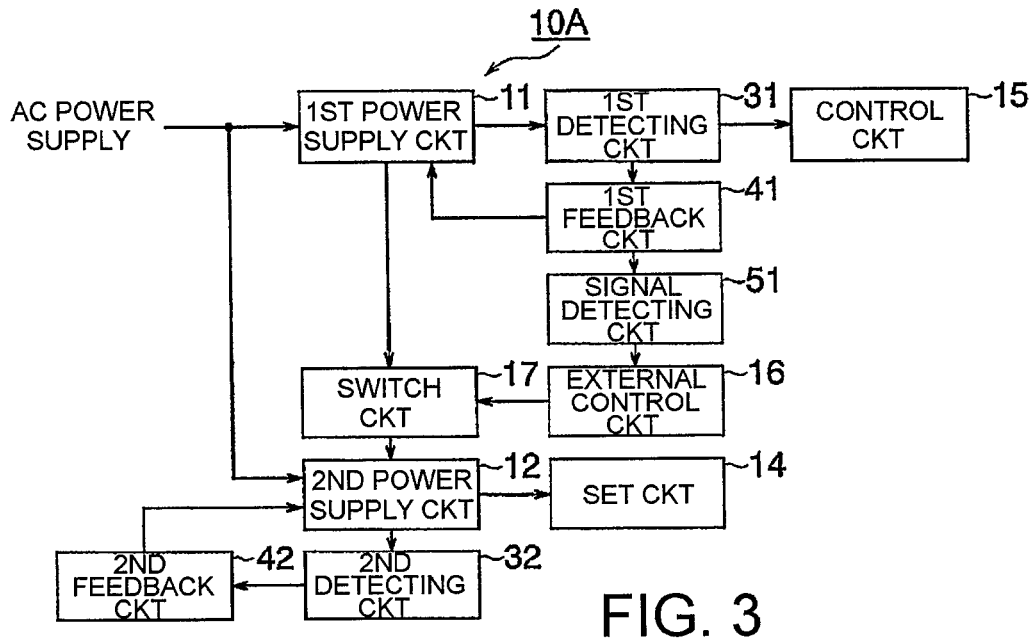
FIG. 3 A block diagram showing a schematic structure of a switching power supply device according to a second embodiment of the present invention.
Figure 4:
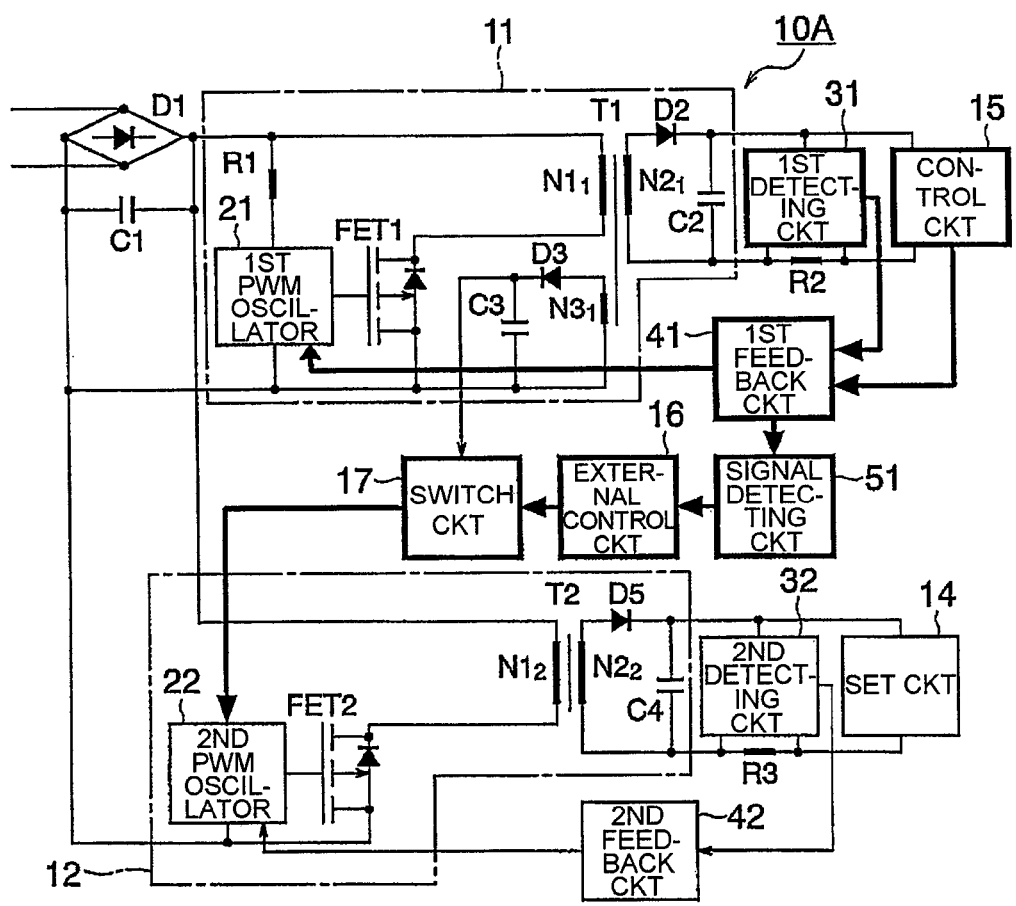
FIG. 4 A block diagram showing a specific example of the switching power supply device shown in FIG. 3.

Referring to FIG. 3 and FIG. 4, a switching power supply device 10A according to a second embodiment of the present invention will be described. The illustrated switching power supply device 10A is similar in structure to that of the switching power supply device 10 illustrated in FIG. 1 and FIG. 2 except that, between the first feedback circuit 41 and the external control circuit 16, a signal detecting circuit 51 is provided. Therefore, components similar in functions to those illustrated in FIG. 1 and FIG. 2 are designated by the same reference numerals and only different points will be described in the following.

The signal detecting circuit 51 detects a part of the first feedback signal produced by the first feedback circuit 41 to deliver a signal detected signal to the external control circuit 16. Specifically, the control circuit 15 which is a load of the first power supply circuit 11 changes in response to an operation of the remote controller. The signal detecting circuit 51 detects this change from the first feedback signal of the first feedback circuit 41. Responsive to the signal detected signal, the external control circuit 16 turns on/off the switch circuit 17 to thereby control operation/stop of the second power supply circuit 12.

Figure 5:
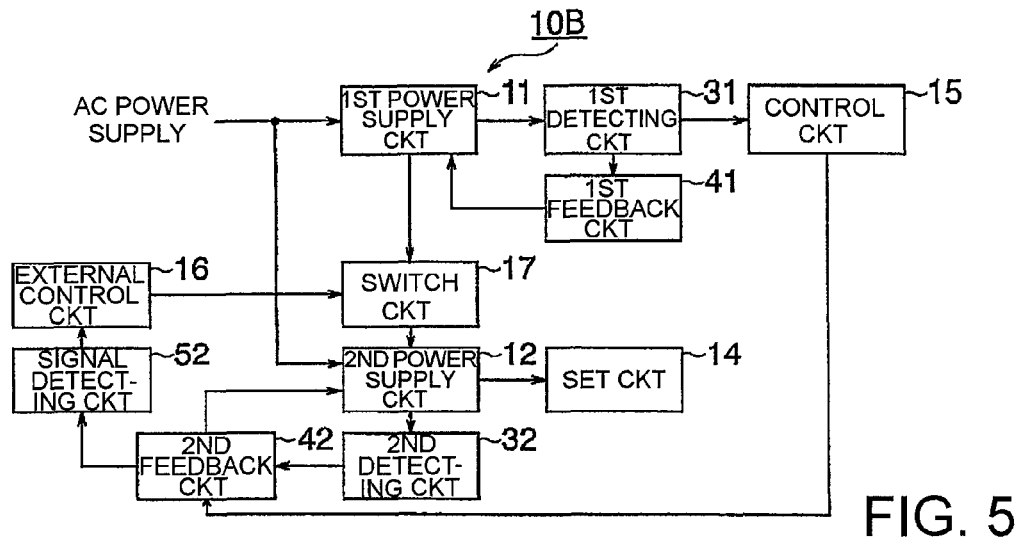
FIG. 5 A block diagram showing a schematic structure of a switching power supply device according to a third embodiment of the present invention.
Figure 6:
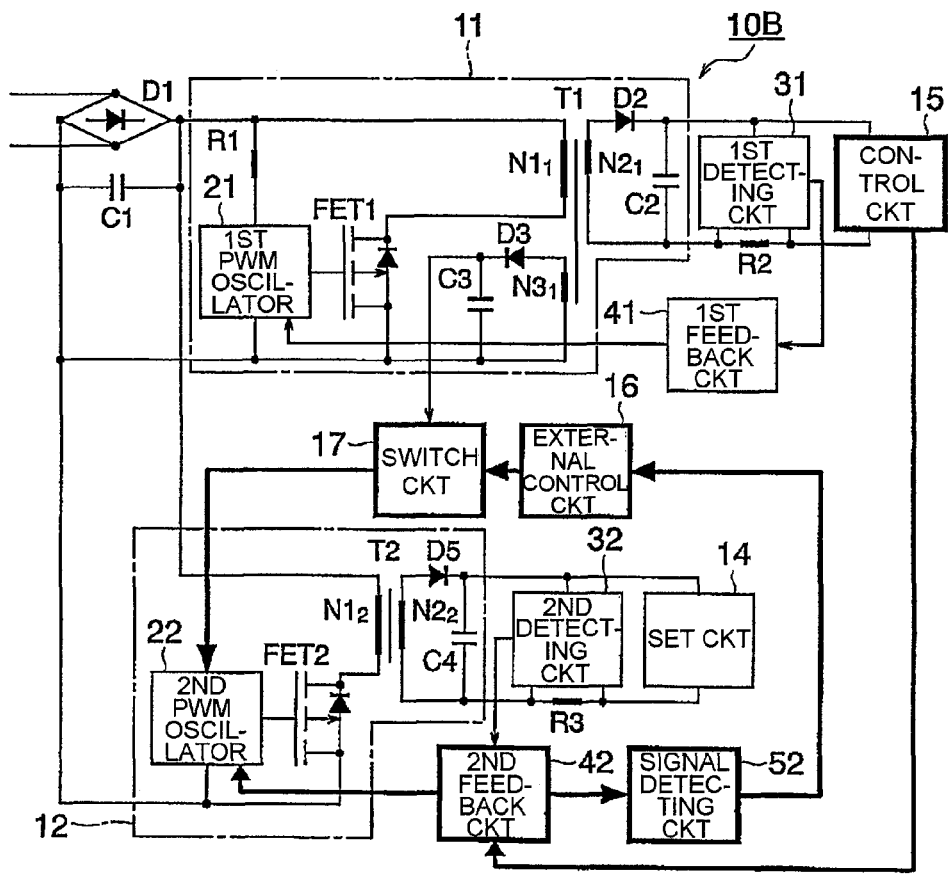
FIG. 6 A block diagram showing a specific example of the switching power supply device shown in FIG. 5.

Referring to FIG. 5 and FIG. 6, a switching power supply device 10B according to a third embodiment of the present invention will be described. The illustrated switching power supply device 10B is similar in structure to that of the switching power supply device 10 illustrated in FIG. 1 and FIG. 2 except that, between the second feedback circuit 42 and the external control circuit 16, a signal detecting circuit 52 is provided and that the signal of the control circuit 15 is delivered to the second feedback circuit 42. Therefore, components similar in functions to those illustrated in FIG. 1 and FIG. 2 are designated by the same reference numerals and only different points will be described in the following.

The control circuit 15 which is a load of the first power supply circuit 11 changes its mode state in response to an operation of the remote controller. The control circuit 15 delivers the changed mode state to the second feedback circuit 42. The second feedback circuit 42 reflects and includes the changed mode state in the second feedback signal. The signal detecting circuit 52 detects the changed mode state included in the second feedback signal to deliver a signal detected signal to the external control circuit 16. Responsive to the signal detected signal, the external control circuit 16 turns on/off the switch circuit 17 to thereby control operation/stop of the second power supply circuit 12.

Figure 7:
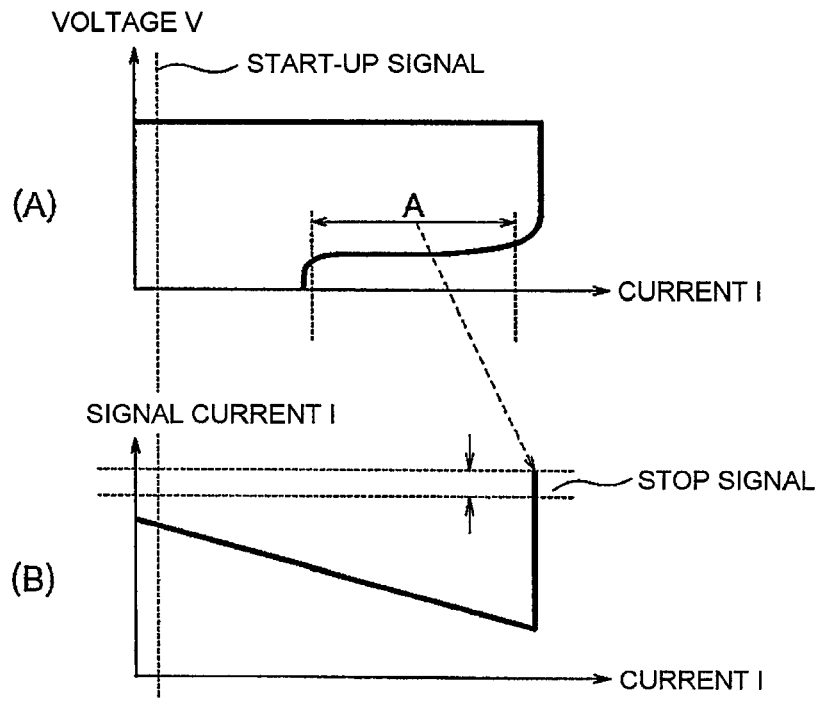
FIG. 7 A view for describing a second feedback signal produced by a second feedback circuit used in the switching power supply device shown in FIG. 6.

Referring to FIG. 7, the second feedback signal produced by the second feedback circuit 42 will be described. In FIG. 7, (A) is a view showing an electric characteristic of the second power supply circuit 12 and (B) is a view showing a characteristic of the second feedback signal produced by the second feedback circuit 42. In FIG. 7(A), a horizontal axis shows an output current I of the second power supply circuit 12, while a vertical axis shows a second output voltage V. In FIG. 7(B), a horizontal axis shows the output current I of the second power supply circuit 12, while a vertical axis shows a signal current of the second feedback signal.

As shown in FIG. 7(A), a range A is an unused part. The signal detecting circuit 52 detects the second feedback signal corresponding to this part to thereby produce the signal detected signal for controlling operation/stop of the second power supply circuit 12.

Figure 8:
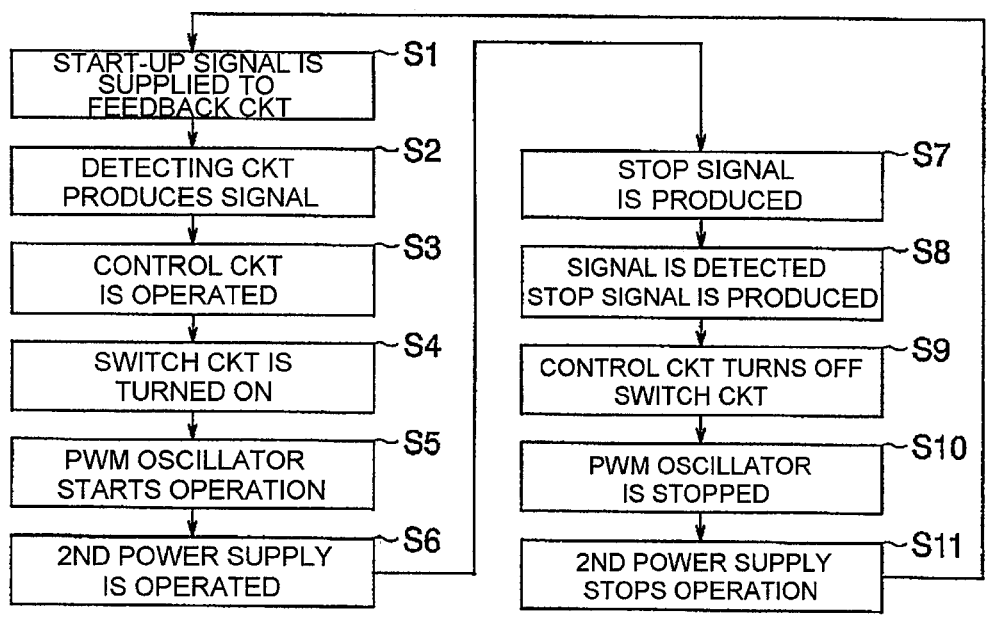
FIG. 8 A flow chart for describing an operation of the switching power supply device shown in FIG. 6.

Next, referring to FIG. 8, an operation of the switching power supply device 10B illustrated in FIG. 6 will be described.

First, a start-up signal is supplied from the control circuit 15 to the second feedback circuit 42 (step S1). Inasmuch as the second feedback circuit 42 produces the start-up signal, the signal detecting circuit 52 detects the start-up signal to produce the start-up signal (step S2). Responsive to this start-up signal, the external control circuit 16 is operated (step S3) to turn on the switch circuit 17 (step S4). Consequently, an electric power generated in the first power supply circuit 11 is supplied to the second PWM oscillator 22 through the switch circuit 17 and the second PWM oscillator 22 starts an operation (step S5). As a result, the second power supply circuit 12 is operated (step S6).

Next, it is assumed that the control circuit 15 delivers a stop signal to the second feedback circuit 42 (step S7). The stop signal produced by the second feedback circuit 42 is detected by the signal detecting circuit 52 and the signal detecting circuit 52 produces the stop signal (step S8). Responsive to the stop signal, the external control circuit 16 turns off the switch circuit 17 (step S9). Consequently, inasmuch as the electric power supply from the first power supply circuit 11 to the second PWM oscillator 22 is stopped, the operation of the second PWM oscillator 22 is stopped (step S10). As a result, the second power supply circuit 12 stops its operation (step S11).

Figure 9:
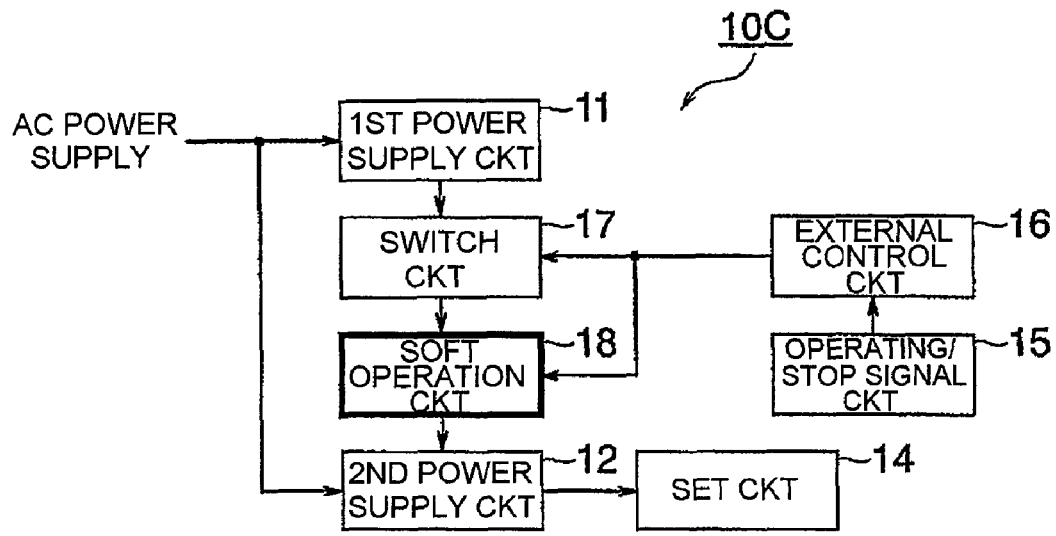
FIG. 9 A block diagram showing a schematic structure of a switching power supply device according to a fourth embodiment of the present invention.

Referring to FIG. 9, a switching power supply device 10C according to a fourth embodiment of the present invention will be described. The illustrated switching power supply device 10C is similar in structure to that of the switching power supply device 10 illustrated in FIG. 1 except that, between the switch circuit 17 and the second power supply circuit 12, a soft operation circuit 18 is further provided. Therefore, components similar in functions to those illustrated in FIG. 1 are designated by the same reference numerals and only different points will be described in the following.

The soft operation circuit 18 is a circuit for gradually (softly) starting the second power supply circuit 12 upon start-up and for gradually (softly) stopping the second power supply circuit 12 upon stopping.

Figure 10:
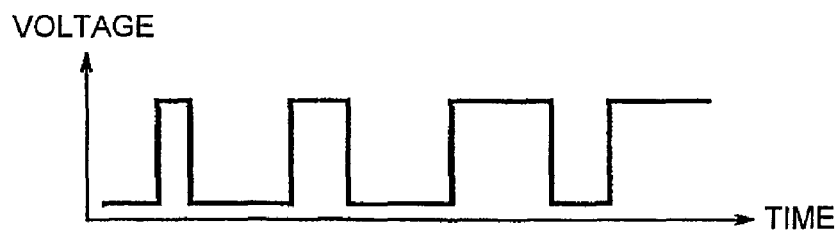
FIG. 10 A waveform diagram showing a waveform of a voltage produced by a soft operation circuit to a second power supply circuit upon starting the second power supply circuit in the switching power supply device shown in FIG. 9.

FIG. 10 is a waveform diagram showing a waveform of a voltage produced by the soft operation circuit 18 to the second power supply circuit 12 when the second power supply circuit 12 is started. As shown in FIG. 10, when the second power supply circuit 12 is started, the soft operation circuit 18 supplies the second power supply circuit 12 with a voltage which is gradually increased in pulse width.

Figure 11:
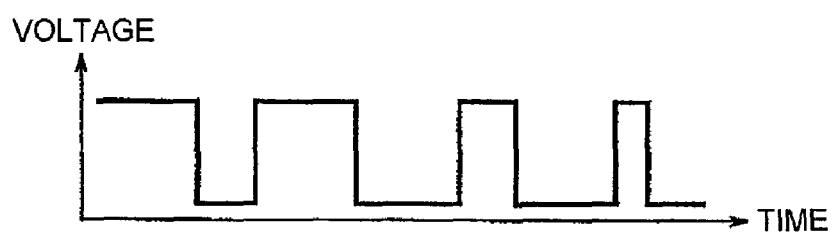
FIG. 11 A waveform diagram showing a waveform of a voltage produced by the soft operation circuit to the second power supply circuit upon stopping the second power supply circuit in the switching power supply device shown in FIG. 9.

FIG. 11 is a waveform diagram showing a waveform of a voltage produced by the soft operation circuit 18 to the second power supply circuit 12 when the second power supply circuit 12 is stopped. As shown in FIG. 11, when the second power supply circuit 12 is stopped, the soft operation circuit 18 supplies the second power supply circuit 2 with a voltage which is gradually reduced in pulse width.

Figure 12:
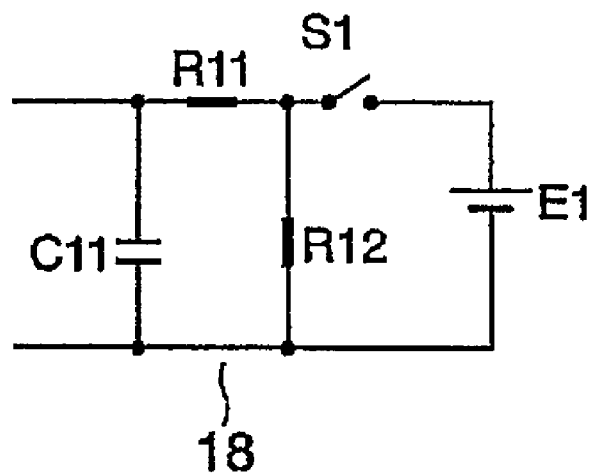
FIG. 12 A circuit diagram showing a part of the soft operation circuit shown in FIG. 9.

FIG. 12 shows a part of a circuit of the soft operation circuit 18 illustrated in FIG. 9. The soft operation circuit 18 includes an electric source E1, a switch S1, a capacitor C11, a first resistor R11, and a second resistor R12. The second resistor R12 is connected in parallel to the electric source E1 through the switch S1. The first resistor R11 and the capacitor C11 are connected in series to each other and this series circuit is connected in parallel to the second resistor R12. Turning on/off of the switch S1 is controlled by the external control circuit 16.

Figure 13:
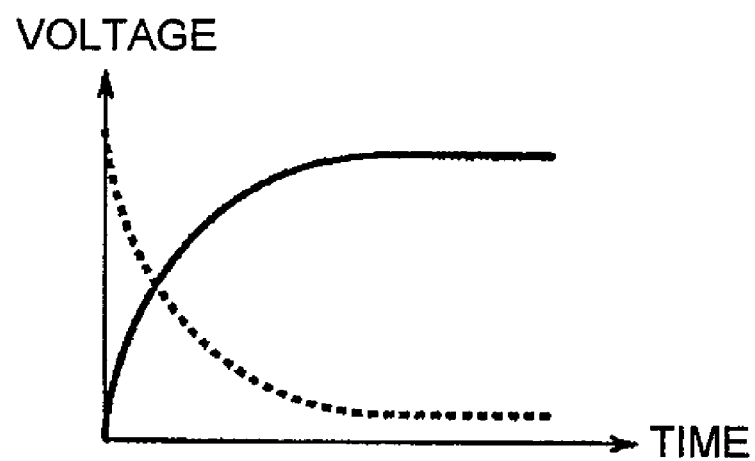
FIG. 13 A characteristic chart showing charge and discharge characteristics of a capacitor shown in FIG. 12.

FIG. 13 shows charge and discharge characteristics of the capacitor C11 illustrated in FIG. 12. In FIG. 13, a solid line shows the charge characteristic of the capacitor C11, while a broken line shows the discharge characteristic of the capacitor C11.

When the second power supply circuit 12 is started, the soft operation circuit 18 modulates a pulse width by using the charge characteristic of the capacitor C11 shown by the solid line in FIG. 13 to thereby supply the second power supply circuit 12 with a voltage which is gradually increased in pulse width as shown in FIG. 10.

On the other hand, when the second power supply circuit 12 is stopped, the soft operation circuit 18 modulates a pulse width by using the discharge characteristic of the capacitor C11 shown by the broken line in FIG. 13 to thereby supply the second power supply circuit 12 with a voltage which is gradually reduced in pulse width as shown in FIG. 11.

Figure 14:
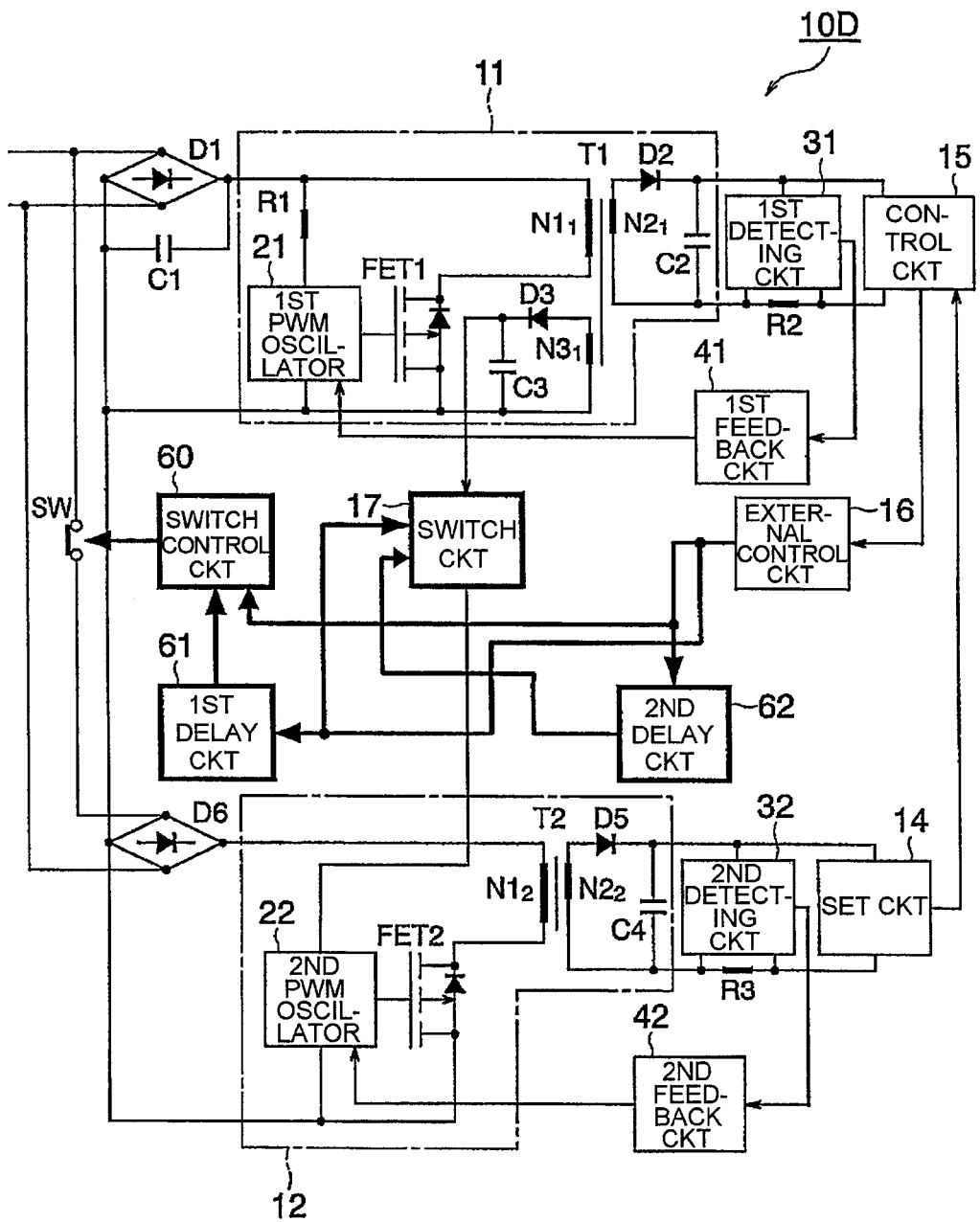
FIG. 14 A block diagram showing a specific example of a switching power supply device according to a fifth embodiment of the present invention.

Referring to FIG. 14, a switching power supply device 10D according to a fifth embodiment of the present invention will be described. The illustrated switching power supply device 10D is a switching power supply device in which a switch SW for turning on/off the second power supply circuit 12 is provided on the side of the second power supply circuit 12.

The illustrated switching power supply device 10D is similar in structure to that of the switching power supply device 10 illustrated in FIG. 2 except that the above-mentioned switch SW, a second full-wave rectifier D6, a switch control circuit 60, and first and second delay circuits 61 and 62 are further provided. Therefore, components similar in functions to those illustrated in FIG. 2 are designated by the same reference numerals and only different points will be described in the following.

An AC power supply (not shown) is connected to the second power supply circuit 12 through the switch SW and the second full-wave rectifier D6. Turning on/off of the switch SW is controlled by the switch control circuit 60. The external control circuit 16 produces either one of a start-up signal (ON signal) and an inactivating signal (OFF signal). The ON signal is directly supplied to the switch circuit 17 and is supplied to the switch control circuit 60 through the first delay circuit 61. On the other hand, the OFF signal is directly supplied to the switch control circuit 60 and is supplied to the switch circuit 17 through the second delay circuit 62.

Figure 15:
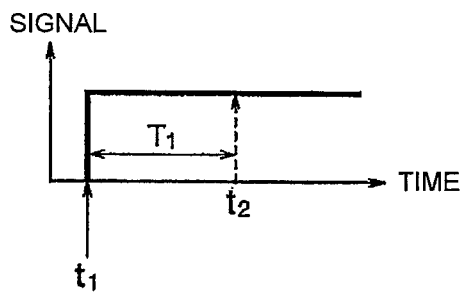
FIG. 15 A time chart for describing an operation when a second power supply circuit is started in the switching power supply device shown in FIG. 14.
Figure 16:
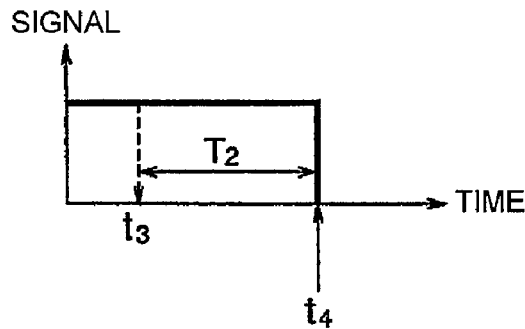
FIG. 16 A time chart for describing an operation when the second power supply circuit is stopped in the switching power supply device shown in FIG. 14.

Referring to FIG. 15 and FIG. 16, an operation of the switching power supply device 10D illustrated in FIG. 14 will be described. FIG. 15 is a time chart for describing an operation when the second power supply circuit 12 is started and FIG. 16 is a time chart for describing an operation when the second power supply circuit 12 is stopped.

First, referring to FIG. 15, the operation when the second power supply circuit 12 is started will be described. In this case, the ON signal (start-up signal) produced by the external control circuit 16 is directly supplied to the switch circuit 17. Therefore, responsive to the ON signal, the switch circuit 17 is turned on at a time instant $t_1$ and an electric power generated in the first power supply circuit 11 is supplied to the second PWM oscillator 22 of the second power supply circuit 12 through the switch circuit 17. Hence, the second PWM oscillator 22 starts an operation at the time instant $t_1$. On the other hand, the above-mentioned ON signal is delayed by a first delay time interval $T_1$ by the first delay circuit 61 and is supplied to the switch control circuit 60. Therefore, the switch control circuit 60 turns on the switch SW at a time instant $t_2$ after lapse of the first delay time interval $T_1$ from the time instant $t_1$. After the switch SW is turned on, an AC voltage from the AC power supply is supplied to the second power supply circuit 12 through the second full-wave rectifier D6.

Next, referring to FIG. 16, the operation when the second power supply circuit 12 is stopped will be described. In this case, the OFF signal (stop signal) produced by the external control circuit 16 is directly supplied to the switch control circuit 60. Responsive to the OFF signal, the switch control circuit 60 turns off the switch SW at a time instant $t_3$. After the switch SW is turned off, the supply of the AC voltage of the AC power supply to the second power supply circuit 12 through the second full-wave rectifier D6 is stopped. On the other hand, the above-mentioned OFF signal is delayed by the second delay circuit 62 and is supplied to the switch circuit 17. Therefore, the switch circuit 17 is turned off at a time instant $t_4$ after lapse of a second delay time interval $T_2$ from the time instant $t_3$. As a result, at the time instant $t_4$, supply of an electric power generated in the first power supply circuit 11 to the second PWM oscillator 22 of the second power supply circuit 12 through the switch circuit 17 is stopped. Therefore, an operation of the second PWM oscillator 22 is stopped at the time instant $t_4$.

Figure 17:
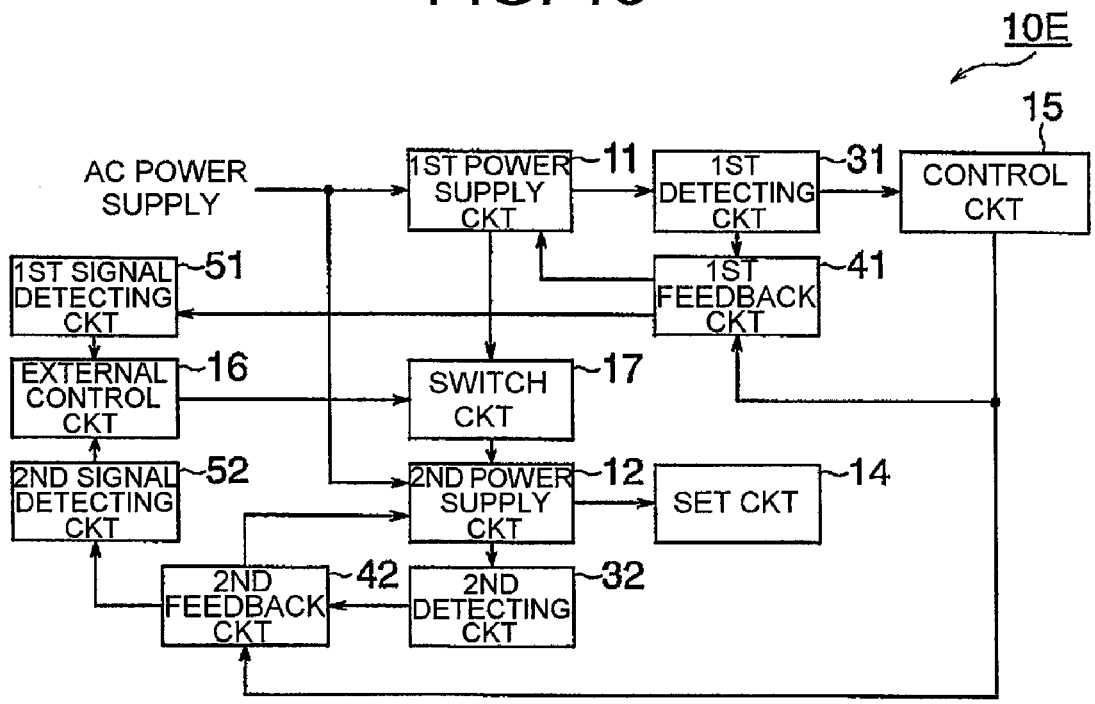
FIG. 17 A block diagram showing a schematic structure of a switching power supply device according to a sixth embodiment of the present invention.
Figure 18:
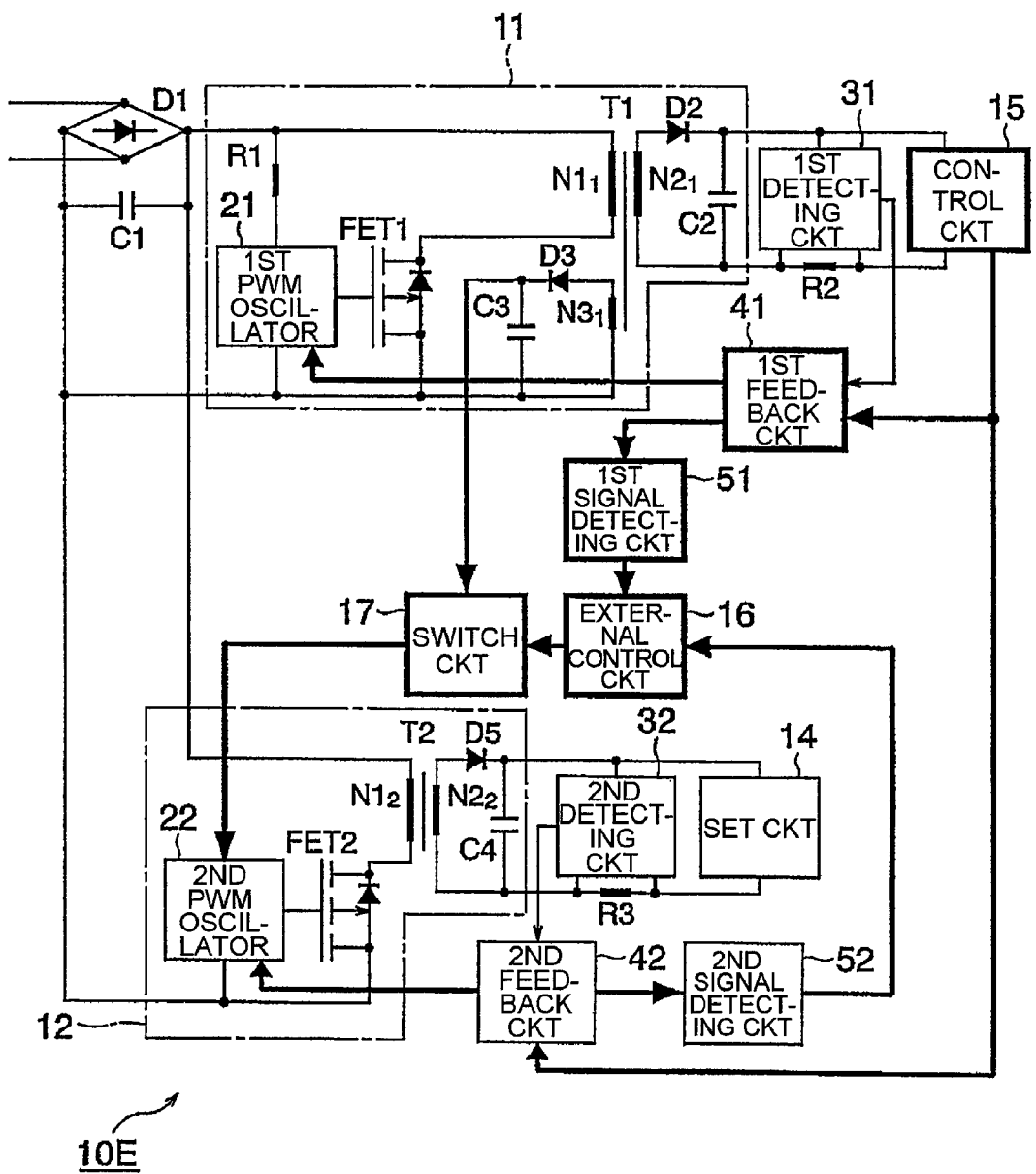
FIG. 18 A block diagram showing a specific example of the switching power supply device shown in FIG. 17.

Referring to FIG. 17 and FIG. 18, a switching power supply device 10E according to a sixth embodiment of the present invention will be described. The illustrated switching power supply device 10E is similar in structure to that of the switching power supply device 10 illustrated in FIG. 1 and FIG. 2 except that the first and the second signal detecting circuits 51 and 52 are further provided and that an operating signal and a stop signal produced by the control circuit 15 are delivered to the first and the second feedback circuits 41 and 42, respectively. In other words, the illustrated switching power supply device 10E is a switching power supply device as a combination of the switching power supply device 10A according to the second embodiment of the present invention illustrated in FIG. 3 and FIG. 4 and the switching power supply device 10B according to the third embodiment of the present invention illustrated in FIG. 5 and FIG. 6. Therefore, components similar in functions to those illustrated in FIG. 1 and FIG. 2 are designated by the same reference numerals and only different points will be described in the following.

The first signal detecting circuit 51 is inserted between the first feedback circuit 41 and the external control circuit 16. The second signal detecting circuit 52 is inserted between the second feedback circuit 42 and the external control circuit 16.

The operating signal produced by the control circuit 15 is delivered to the first feedback circuit 41. The first feedback circuit 41 produces the first feedback signal including the operating signal. Upon detecting the operating signal from the first feedback signal, the first signal detecting circuit 51 supplies an ON signal to the external control circuit 16. Responsive to the ON signal, the external control circuit 16 turns on the switch circuit 17 to supply an electric power generated in the first power supply circuit 11 to the second PWM oscillator 22 of the second power supply circuit 12 through the switch circuit 17.

On the other hand, the stop signal produced by the control circuit 15 is delivered to the second feedback circuit 42. The second feedback circuit 42 produces the second feedback signal including the stop signal. Upon detecting the stop signal from the second feedback signal, the second signal detecting circuit 52 supplies an OFF signal to the external control circuit 16. Responsive to the OFF signal, the external control circuit 16 turns off the switch circuit 17 to stop the supply of an electric power from the first power supply circuit 11 to the second PWM oscillator 22 of the second power supply circuit 12.

As described above, in the illustrated switching power supply device 10E, an ON operation of the second power supply circuit 12 is carried out by using the first feedback signal generated on the side of the first power supply circuit 11, while an OFF operation of the second power supply circuit 12 is carried out by using the second feedback signal generated on the side of the second power supply circuit 12.

In the switching power supply device 10E illustrated in FIG. 17 and FIG. 18, the operating signal and the stop signal produced by the control circuit 15 are delivered to the first and the second feedback circuits 41 and 42, respectively. Alternatively, the operating signal and the stop signal produced by the control circuit 15 may be delivered to the second and the first feedback circuits 42 and 41, respectively. In this case, the ON operation of the second power supply circuit 12 is carried out by using the second feedback signal generated on the side of the second power supply circuit 12, while the OFF operation of the second power supply circuit 12 is carried out by using the first feedback signal generated on the side of the first power supply circuit 11.

As described above, the ON operation and the OFF operation are distributed to the first feedback circuit 41 and the second feedback circuit 42, respectively. Therefore, a malfunction can be prevented as compared with the case where the ON/OFF operations are carried out by the same feedback circuit. Further, the first and the second signal detecting circuits 51 and 52 can be simplified in structure. In this case, inasmuch as the first power supply is continuously kept in an ON state, the ON signal is preferably transmitted via a route of the first feedback circuit 41.

Figure 19:
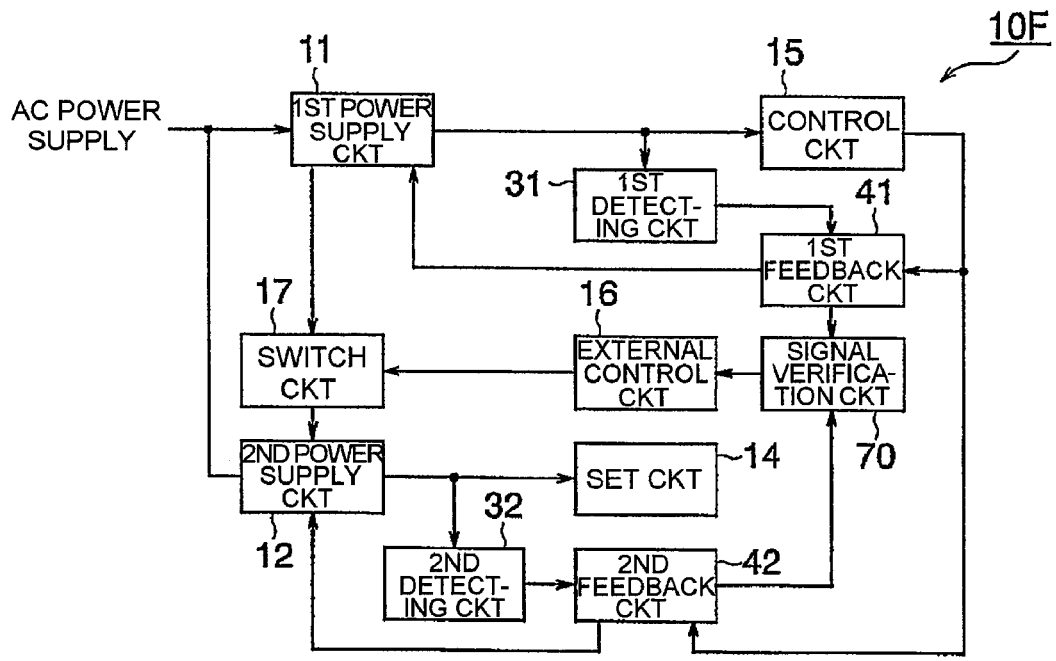
FIG. 19 A block diagram showing a schematic structure of a switching power supply device according to a seventh embodiment of the present invention.

Referring to FIG. 19, a switching power supply device 10F according to a seventh embodiment of the present invention will be described. The illustrated switching power supply device 10F is similar in structure to that of the switching power supply device 10E illustrated in FIG. 17 except that, in place of the first and the second signal detecting circuits 51 and 52, a signal verification circuit 70 is provided. Therefore, components similar in functions to those illustrated in FIG. 17 are designated by the same reference numerals and only different points will be described in the following.

The operating signal and the stop signal produced by the control circuit 15 are delivered to the first and the second feedback circuits 41 and 42. The signal verification circuit 70 detects the operating signal or the stop signal in the first feedback signal produced by the first feedback circuit 41 and in the second feedback signal produced by the second feedback circuit 42.

In case where the stop signals are detected both in the first and the second feedback signals, the signal verification circuit 70 delivers an OFF signal to the external control circuit 16. In case where the stop signal is detected in the first feedback signal and the operating signal is detected in the second feedback signal, the signal verification circuit 70 delivers an OFF signal to the external control circuit 16. In case where the operating signal is detected in the first feedback signal and the stop signal is detected in the second feedback signal, the signal verification circuit 70 delivers an OFF signal to the external control circuit 16. In case where the operating signals are detected both in the first and the second feedback signals, the signal verification circuit 70 delivers an ON signal to the external control circuit 16.

Thus, in the illustrated switching power supply device 10F, the signals in the first and the second feedback signals are detected and, only in case where both of the detected signals are the operating signals, an operation of the second power supply circuit 12 is started. On the other hand, in case where the signals detected from the first and the second feedback signals are not coincident with each other or both of the signals are the stop signals, an operation of the second power supply circuit 12 is stopped.

As described above, only when both of the first and the second feedback circuits 41 and 42 produce the operating signals, an ON signal is delivered to the external control circuit 16. This makes it possible to reduce generation of the ON signal due to a malfunction caused by noise or the like.

Incidentally, in the embodiments mentioned above, description has been made about a case where the number of the power supply circuits is two and there are two feedback signals. However, it is readily understood that the present invention is also extendable and applicable to a case where the number of the power supply circuits is three or more and there are three or more feedback signals. In this case, only in case where all signals detected in the three or more feedback signals are the operating signals, an operation of a specific power supply circuit is started.

Figure 20:
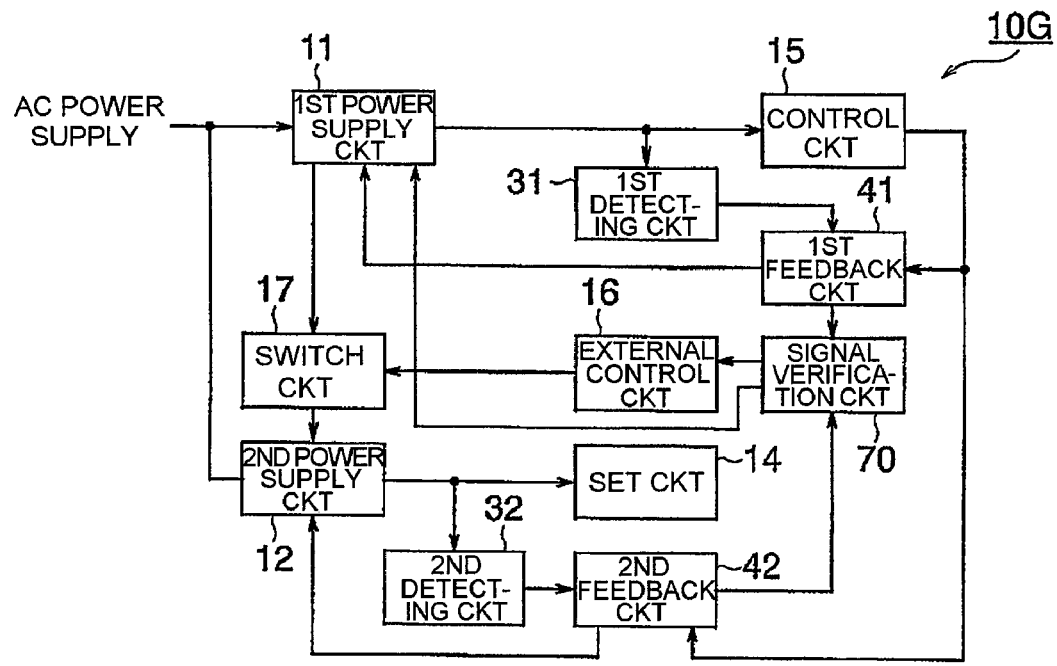
FIG. 20 A block diagram showing a schematic structure of a switching power supply device according to an eighth embodiment of the present invention.

Referring to FIG. 20, a switching power supply device 10G according to an eighth embodiment of the present invention will be described. The illustrated switching power supply device 10G is similar in structure to that of the switching power supply device 10F illustrated in FIG. 19 except that the signal verification circuit 70 delivers an operation stop signal to the first power supply circuit 11 as will later be described. Therefore, components similar in functions to those illustrated in FIG. 19 are designated by the same reference numerals and only different points will be described in the following.

In case where signals detected in the first and the second feedback signals are different from each other or both of the signals are the stop signals, the signal verification circuit 70 delivers the operation stop signal to the first power supply circuit 11. Responsive to the operation stop signal, the first power supply circuit 11 stops its operation.

Thus, in the switching power supply device 10F illustrated in FIG. 19, an operation of only the second power supply circuit 12 is controlled. On the other hand, in the switching power supply device 10G illustrated in FIG. 20, operations of not only the second power supply circuit 12 but also the first power supply circuit 11 are controlled. In other words, in case where the signals detected in the feedback signals are not coincident with each other, operations of all power supply circuits are stopped.

As described above, in case where the signals detected in the first and the second feedback circuits 41 and 42 are different from each other or both of the signals are the stop signals, an abnormal state is determined and the first and the second power supplies 11 and 12 are stopped. Thereby, it is possible to shut down all power supplies of the apparatus and to ensure the safety of the apparatus against ignition, destruction, or the like.

Hereinbefore, description has been made about the present invention in connection with the preferred embodiments thereof. However, it will readily be understood that various modifications may be made by the skilled person without departing from the spirit of the invention.

The invention claimed is:

1. A switching power supply device using a first power supply circuit for generating a first output power and a second power supply circuit for generating a second output power higher than the first output power, said device comprising:
   a switch circuit inserted between said first power supply circuit and said second power supply circuit and supplying/stopping, in response to a control signal, an electric power fed from said first power supply circuit to said second power supply circuit and required for starting said second power supply circuit;
   an operating/stop signal circuit for generating an operating signal or a stop signal;
   an external control circuit, responsive to the operating signal or the stop signal, for supplying the control signal to said switch circuit to turn on/off said switch circuit;
   a first detecting circuit for detecting the first output power of said first power supply circuit to produce a first output power detection signal;
   a first feedback circuit for feeding back the first output power detection signal as the first feedback signal to a primary-side circuit of said first power supply circuit;
   a second detecting circuit for detecting the second output power of said second power supply circuit to produce a second output power detected signal;
   a second feedback circuit for feeding back the second output power detection signal as the second feed back signal to a primary-side circuit of said second power supply circuit; and
   detecting means for detecting at least one of the first and the second feedback signals to deliver a detected signal to said external control circuit.

2. The switching power supply device as claimed in claim 1, wherein:
   said first power supply circuit comprises a first insulating transformer having a primary winding, a secondary winding, and an auxiliary winding; a first switching element connected to said primary winding of said first insulating transformer; first rectifying/smoothing means for rectifying/smoothing an AC voltage induced in said secondary winding of said first insulating transformer to produce a first output voltage; a first control circuit for turning on/off said first switching element in response to the first feedback signal; and auxiliary rectifying/smoothing means for rectifying/smoothing an AC voltage induced in said auxiliary winding to produce an auxiliary voltage;
   said second power supply circuit comprising a second insulating transformer having a primary winding and a secondary winding; a second switching element connected to said primary winding of said second insulating transformer, second rectifying/smoothing means for rectifying/smoothing an AC voltage induced in said secondary winding of said second insulating transformer to produce a second output voltage; and a second control circuit for turning on/off said second switching element in response to the second feedback signal;
   said switch circuit selectively supplying, in response to the control signal, the auxiliary voltage as the required electric power to said second control circuit.

3. The switching power supply device as claimed in claim 1, comprising:
   a signal detecting circuit, as said detecting means, inserted between said first feedback circuit and said external control circuit, said signal detecting circuit detecting a part of the first feedback signal to deliver a signal detected signal to said external control circuit.

4. The switching power supply device as claimed in claim 1, wherein:
   said operating/stop signal circuit delivers a mode state changing depending upon a load of said first power supply circuit to said second feedback circuit, said second feedback circuit producing the second feedback signal including the changed mode state;
   said switching power supply device comprising, as said detecting means, a signal detecting circuit inserted between said second feedback circuit and said external control circuit, said signal detecting circuit detecting the changed mode state included in the second feedback signal to deliver a signal detected signal to said external control circuit.

5. The switching power supply device as claimed in claim 1, further comprising a soft operation circuit inserted between said switch circuit and said second power supply circuit, said soft operation circuit gradually starting said second power supply circuit upon start-up and gradually stopping said second power supply circuit upon stopping.

6. The switching power supply device as claimed in claim 1, further comprising a switch for turning on/off an AC power supply supplied to said second power supply circuit, and a switch control circuit for controlling on/off of said switch;
   said external control circuit producing either one of an ON signal and an OFF signal as the control signal, the ON signal being directly supplied to said switch circuit, the OFF signal being directly supplied to said switch control circuit;
   said switching power supply device further comprising:
   a first delay circuit for delaying the ON signal by a first delay time interval to supply a delayed ON signal to said switch control circuit; and
   a second delay circuit for delaying the OFF signal by a second delay time interval to supply a delayed OFF signal to said switch circuit.

7. The switching power supply device as claimed in claim 1, wherein:
   said operating/stop signal circuit delivers the operating signal and the stop signal to said first feedback circuit and said second feedback circuit, respectively, said first feedback circuit producing the first feedback signal including the operating signal, said second feedback circuit producing the second feedback signal including the stop signal;
   said switching power supply device comprising, as said detecting means:

a first signal detecting circuit inserted between said first feedback circuit and said external control circuit, said first signal detecting circuit supplying an ON signal to said external control circuit when the operating signal is detected from the first feedback signal; and a second signal detecting circuit inserted between said second feedback circuit and said external control circuit, said second signal detecting circuit supplying an OFF signal to said external control circuit when the stop signal is detected from the second feedback signal.

8. The switching power supply device as claimed in claim 1, wherein:

said operating/stop signal circuit delivers the operating signal or the stop signal to said first and said second feedback circuits, said first and said second feedback circuits producing the first and the second feedback signals including the operating signal or the stop signal;

said switching power supply device comprising, as the detecting means, a signal verification circuit for detecting the signals in the first and the second feedback signals, said signal verification circuit delivering an ON signal to said external control circuit only when both of the detected signals are the operating signals and otherwise delivering an OFF signal to said external control circuit.

9. The switching power supply device as claimed in claim 8, wherein:

said signal verification circuit in said switching power supply device delivers an operation stop signal to said first power supply circuit when the detected signals are different;

said first power supply circuit stopping its operation in response to the operation stop signal.

* * * * *